United States Patent [19]

Morgan

[11] 4,401,768
[45] Aug. 30, 1983

[54] SI$_3$N$_4$ CERAMIC DENSIFIED USING SC$_2$O$_3$ AND SIO$_2$

[75] Inventor: Peter E. D. Morgan, Thousand Oaks, Calif.

[73] Assignee: Rockwell International Corporation, El Segundo, Calif.

[21] Appl. No.: 357,949

[22] Filed: Mar. 15, 1982

[51] Int. Cl.$^3$ .............................................. C04B 35/58
[52] U.S. Cl. ...................................... 501/98; 501/152
[58] Field of Search ........................... 501/98, 97, 152

[56] References Cited

U.S. PATENT DOCUMENTS 3,833,389  9/1974  Komeya et al. ................. 501/98 X
4,046,580  9/1977  Ishii et al. ........................... 501/98
4,234,343  11/1980  Andersson ........................... 501/98

FOREIGN PATENT DOCUMENTS 54-15916  2/1979  Japan ..................................... 501/97
1312315  4/1973  United Kingdom .

OTHER PUBLICATIONS

F. F. Lange, E. I. Davis, D. R. Clarke, "Compressive Creep of Si$_3$N$_4$/MgO Alloys", Journal of Materials Science 15 (1980), pp. 601-610.
F. F. Lange, "Silicon Nitride Polyphase Systems: Fabrication, Microstructure, and Properties", International Metals Reviews, 1980, No. 1, pp. 1-20.

Primary Examiner—Helen M. McCarthy
Attorney, Agent, or Firm—H. Fredrick Hamann; Craig O. Malin

[57]  ABSTRACT

At least 1 mole % SiO$_2$ and $\frac{1}{2}$ mole % Sc$_2$O$_3$ are used as a densification aid to provide a polyphase silicon nitride ceramic having high creep strength. The composition is within the Si$_3$N$_4$ - Si$_2$N$_2$O tie line, the Si$_3$N$_4$ - Sc$_2$Si$_2$O$_7$ tie line, and the Sc$_2$Si$_2$O$_7$ - Si$_2$N$_2$O tie line in the ternary phase diagram for the Si$_3$N$_4$, SiO$_2$, Sc$_2$O$_3$ system. The phases in the sintered ceramic are Sc$_2$Si$_2$O$_7$, and Si$_3$N$_2$O, and at least 50 mole % Si$_3$N$_4$.

3 Claims, 1 Drawing Figure

$Si_3N_4$ CERAMIC DENSIFIED USING $Sc_2O_3$ AND $SiO_2$

STATEMENT OF GOVERNMENT INTEREST

This invention was made under a contract with the Department of Navy.

BACKGROUND OF THE INVENTION

This invention relates to the field of ceramics, and particularly to $Si_3N_4$ ceramics.

Silicon nitride ceramics encompass a family of compositions in which $Si_3N_4$ constitutes an important ingredient. Considerable effort has been expended and is being expended to develop ceramics which have useful structural properties at high temperatures. In particular, there is a continuing need for $Si_3N_4$ ceramics which have high oxidation and creep resistance.

$Si_3N_4$ ceramics are produced by compacting $Si_3N_4$ powder and then sintering or hot pressing the powder at high temperature. Very pure $Si_3N_4$ powder cannot be successfully sintered or hot pressed and consequently a densification aid must be added to the $Si_3N_4$ powder in order to obtain dense $Si_3N_4$. The densification aid reacts with $SiO_2$ on the surface of the $Si_3N_4$ particles, with the $Si_3N_4$, and with impurities in the powder to form a eutectic liquid during sintering. The liquid promotes densification of the powder through a solution-reprecipitation mechanism.

Upon cooling, the liquid freezes and forms secondary phases. The number, chemistry, and content of the secondary phases depend on the constituents in the starting powder and the phase relationship of the composite system. Both non-equilibrium (nitrogen glasses) and crystalline phases are observed. Thus, $Si_3N_4$ alloys are polyphase materials. As expected, the secondary phases significantly influence the properties of the ceramic, unfortunately by decreasing the ceramic's creep and oxidation strength at high temperatures.

One approach to overcoming the harmful effect of the secondary phase is to reduce the amount of secondary phase in the ceramic. U.S. patent application Ser. No. 266,244, filed May 22, 1981 by F. F. Lange and D. R. Clarke, describe a method of drawing out some of the glassy phase by a post-fabrication oxidation treatment.

Another approach is to use ingredients which produce a secondary phase which has improved high temperature properties. This second approach is attempted in the method described in U.S. Pat. No. 4,046,580, wherein $Y_2O_3$ is used as a densification aid.

Currently, MgO is the densification aid used in most commercial $Si_3N_4$ ceramics. Other known aids include $ZrO_2$, $Al_2O_3$, BeO, and the rare earth oxides $Y_2O_3$, $CeO_2$, $Ce_2O_3$, $Nd_2O_3$, and $La_2O_3$. Unfortunately, all these aids form intergranular phases which are either viscous glasses at high temperature (thus reducing the ceramic's creep strength) or are metal-silicon-oxynitride compounds (sometimes causing cracking by expanding during oxidation).

SUMMARY OF THE INVENTION

It is an object of the invention to provide an improved $Si_3N_4$ ceramic.

It is an object of the invention to provide a $Si_3N_4$ ceramic having improved creep strength and improved oxidation resistance.

It is an object of the invention to provide a densification aid for use in fabricating $Si_3N_4$ ceramic having improved high temperature properties.

According to the invention, $Sc_2O_3$ and $SiO_2$ are used as a densification aid during the sintering of $Si_3N_4$ powder. The amount of $Sc_2O_3$ and $SiO_2$ used is selected to be within the composition defined by a triangle formed by the $Si_3N_4$-$Si_2N_2O$ tie line, the $Si_3N_4$-$Sc_2Si_2O_7$ tie line, and the $Sc_2Si_2O_7$-$Si_2N_2O$ tie line in the ternary phase diagram for the $Si_3N_4$, $SiO_2$, $Sc_2O_3$ system. No quaternary compound is formed within this composition range so that problems such as cracking caused by the expansion on oxidation of quaternary compounds (metal-silicon-oxynitrides) are avoided.

The powders used to form the ceramic should include 25 to 98.5 mole % $Si_3N_4$, 1 to 50 mole % $SiO_2$, and 0.5 to 25 mole % $Sc_2O_3$. The proportion of these powders is selected so that the ceramic, after sintering, will contain at least 50 mole % $Si_3N_4$ with the balance being the phases $Si_2N_2O$ and $Sc_2Si_2O_7$. It must be recognized that most $Si_3N_4$ powders already contain some $SiO_2$ and this must be taken into account.

DESCRIPTION OF THE PREFERRED EMBODIMENT

Figure 1:
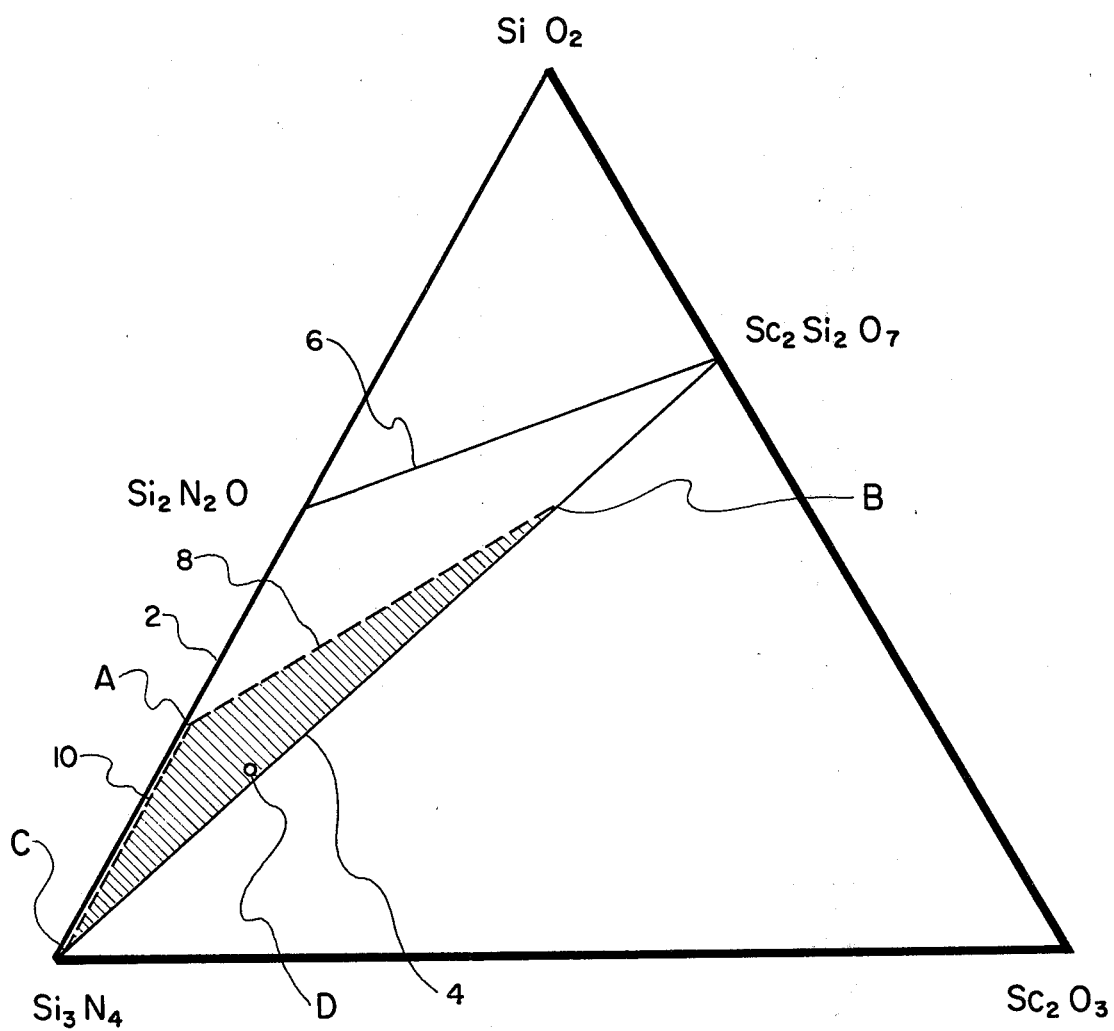
FIG. 1 is a ternary phase diagram in mole % for the $Si_3N_4$, $SiO_2$, $Sc_2O_3$ system for samples hot-pressed in graphite dies at 1600° to 1800° C.

It has been discovered that $Sc_2O_3$ and $SiO_2$ can be used as a densification aid for sintering $Si_3N_4$ powder in such a way that no quaternary compounds (scandium-silicon-oxynitrides) are formed. Such quaternary compounds could cause problems such as cracking caused by expansion on oxidation.

To determine the phases formed during sintering, mixtures of $Si_3N_4$, $Sc_2O_3$, and $SiO_2$ powders were hot-pressed in graphite dies at temperatures from 1600° to 1800° C. The sintered samples were ground into powder and x-ray analyzed to identify the constituent phases and to construct the ternary phase diagram shown in FIG. 1. No quaternary compounds were observed. The compounds observed were $Si_3N_4$, $Si_2N_2O$, and $Sc_2Si_2O_7$. Their tie lines were the $Si_3N_4$-$Si_2N_2O$ tie line 2, the $Si_3N_4$-$Sc_2Si_2O_7$ tie line 4, and the $Sc_2Si_2O_7$-$Si_2N_2O$ tie line 6.

This invention is limited to compositions within tie lines 2, 4, and 6, in order to insure that only three compounds ($Si_3N_4$, $Sc_2Si_2O_7$, and $Si_2N_2O$) can exist in the sintered ceramic. These three compounds are compatible with each other, and additionally the $Sc_2Si_2O_7$ is compatible with $SiO_2$ which is the oxidation product of $Si_3N_4$. In order to obtain the intrinsic properties of $Si_3N_4$ such as low thermal expansion and moderate elastic modulus, the composition is also limited to a minimum of 50 mole % $Si_3N_4$ in the sintered ceramic, as shown by dashed line 8.

A minimum of about 0.5 mole % $Sc_2O_3$ is required in the mixture of powders to serve as a densification aid as shown by dashed line 10. This minimum amount of $Sc_2O_3$ intersects the $Si_3N_4$-$Sc_2Si_2O_7$ tie line 4 at about 1 mole % $SiO_2$, thus setting the minimum amount of $SiO_2$ required as a densification aid in the $Si_3N_4$ rich corner of the phase diagram.

When $Si_3N_4$, $SiO_2$, and $Sc_2O_3$ powders are mixed and sintered at 1600°–1800° C., they react to form a sintered ceramic according to the following relationship:

$$xSi_3N_4 + ySiO_2 + (1-x-y)Sc_2O_3 \rightarrow aSi_3N_4 + bSi_2N_2O + cSc_2Si_2O_7.$$

Point A in FIG. 1 is a composition using the minimum amount of $Sc_2O_3$ powder (0.5 mole %) and providing a sintered ceramic with the minimum amount of $Si_3N_4$ (50 mole %). Using the above relationship, the mixture of powders required at Point A is: 74 mole % $Si_3N_4$, 25.5 mole % $SiO_2$, and 0.5 mole % $Sc_2O_3$. After sintering this mixture of powders, the sintered ceramic should have a composition of: 50 mole % $Si_3N_4$, 49.5 mole % $Si_2N_2O$, and 0.5 mole % $Sc_2Si_2O_7$.

Point B in FIG. 1 is a composition using the minimum amount of $Si_3N_4$ powder (25 mole %) and providing a sintered ceramic with the minimum amount of $Si_3N_4$ (50 mole %). Using the above relationship, the mixture of powders required at point B is: 25 mole % $Si_3N_4$, 50 mole % $SiO_2$, and 25 mole % $Sc_2O_3$. After sintering this mixture of powders, the sintered ceramic should have a composition of: 50 mole % $Si_3N_4$ and 50 mole % $Sc_2Si_2O_7$.

Point C in FIG. 1 is a composition using the minimum amounts of $Sc_2O_3$ and $SiO_2$ powders. Using the above relationship, the mixture of powders at point C is: 0.5 mole % $Sc_2O_3$, 1.0 mole % $SiO_2$, and 98.5 mole % $Si_3N_4$. After sintering this mixture of powders, the sintered ceramic should have a composition of: 99.5 mole % $Si_3N_4$ and 0.5 mole % $Sc_2Si_2O_7$.

In order to determine the properties of a ceramic made according to the present invention, a mixture of powders containing 74 mole % $Si_3N_4$, 18 mole % $SiO_2$, and 8 mole % $Sc_2O_3$ (Composition D in FIG. 1) was prepared. The powders were milled in methanol with WC grinding media, dried, and then hot-pressed at 29 M Pa in graphite dies. Table I lists the hot-pressing conditions, densities achieved, and the observed phases, the quantities of which (according to the previously mentioned relationship) should be: 4.8 mole % $Si_2N_2O$, 9.5 mole % $Sc_2Si_2O_7$, and the balance substantially $Si_3N_4$. As indicated, the theoretical density of 3.21 g cm$^{-3}$ could be achieved in 2 hours at 1800° C., but a 4 hour hold was required to nearly complete the $\alpha$ to $\beta$ phase transformation of the $Si_3N_4$. The sluggish densification and transformation kinetics of this composition as evidenced by these results relative to other $Si_3N_4$ systems would be indicative of slow kinetics in the solution/reprecipitation reaction which would imply good high temperature creep resistance also.

TABLE I.

| Hot-pressing conditions | Density (g/cm³) | Phases |
|---|---|---|
| 1750° C./2 h | 2.62 | $\alpha$-$Si_3N_4$, $\beta$-$Si_3N_4$, $Sc_2Si_2O_7$, $Si_2N_2O$ |
| 1800° C./1 h | 3.14 | $\beta$-$Si_3N_4$, $\alpha$-$Si_3N_4$, $Sc_2Si_2O_7$, $Si_2N_2O$ |
| 1800° C./2 h | 3.21 | $\beta$-$Si_3N_4$, $Sc_2Si_2O_7$, $\alpha$-$Si_3N_4$, $Si_2N_2O$ |
| 1800° C./4 h | 3.21 | $\beta$-$Si_3N_4$, $Sc_2Si_2O_7$, $\alpha$-$Si_3N_4$(Tr), $Si_2N_2O$ |

Specimens for preliminary oxidation and compressive creep experiments were diamond cut and ground from the Composition D billet hot pressed at 1800° C. for 4 hours.

After 285 hours of oxidation in air at 1400° C., the specimen had a slight, glassy patina and had gained $4.4 \times 10^{-3}$ kg·m$^{-2}$. This weight gain is much lower than for commercially available $Si_3N_4$. $Sc_2Si_2O_7$ is compatible with $Sc_2O_3$, $Si_2N_2O$, and $SiO_2$ so that destructive interaction on oxidation is avoided and the protective oxidation surface layers have good integrity and remain thin as confirmed by these oxidation tests.

Compressive creep measurements were conducted in air at 1400° C. using the method described by F. F. Lange, D. R. Clarke, and B. I. Davis in "Compressive Creep of $Si_3N_4$/Magnesium Oxide Alloys, Part I, Effect of Composition", *The Journal of Material Science*, Vol. 15, (1980). The specimen's creep resistance was 1 to 2 orders of magnitude higher than for the $Si_3N_4$/MgO material examined in the above mentioned article.

The microstructure of the Composition D $Si_3N_4$/$Sc_2O_3$ material was examined using high-resolution electron microscopy and analytical electron microscopy. Gains of $Si_3N_4$ were surrounded by grains of the secondary phase crystalline $Sc_2Si_2O_7$. There was an extremely thin (approximately 1 nm), continuous intergranular phase. In addition, a few large pockets of glass were seen, suggesting that the volume fraction of non-crystalline phase present was small.

Numerous variations and modifications can be made without departing from the invention. For example, the ceramic can include minor impurities or additives which are included for their known effect. Accordingly, it should be clearly understood that the form of the invention described above and shown in the accompanying drawings. is illustrative only and is not intended to limit the scope of the invention.

What is claimed is:

1. A ceramic having good oxidation and creep resistance at 1400° C., said ceramic having a composition within the following tie lines in the ternary phase diagram:
   $Si_3N_4$-$Si_2N_2O$ tie line;
   $Si_3N_4$-$Sc_2Si_2O_7$ tie line;
   $Sc_2Si_2O_7$-$Si_2N_2O$; and
   containing more than 50 mole % $Si_3N_4$ and at least 0.5 mole % $Sc_2Si_2O_7$.

2. A densified, polyphase ceramic having good oxidation and creep resistance at 1400° C., said ceramic consisting essentially of:
   4.8 mole % $Si_2N_2O$;
   9.5 mole % $Sc_2Si_2O_7$; and
   balance substantially $Si_3N_4$.

3. An improvement in a method of forming a densified polyphase ceramic, said method having the steps of:
   providing over 25 mole % $Si_3N_4$ powder;
   providing a densification aid;
   mixing said $Si_3N_4$ with said densification aid; and
   sintering the mixture;
said improvement being characterized in that said step of providing a densification aid comprises:
   providing from 1 to 50 mole % $SiO_2$ powder; and
   from $\frac{1}{2}$ to 25 mole % $Sc_2O_3$ powder, whereby the oxidation and creep resistance at 1400° C. of said ceramic are increased.

* * * * *